United States Patent
Polyzopoulos

(10) Patent No.: US 11,913,357 B2
(45) Date of Patent: Feb. 27, 2024

(54) SEAL INTERFACE BETWEEN A TRANSITION DUCT AND A STAGE ONE VANE STRUCTURE

(71) Applicant: Siemens Energy, Inc., Orlando, FL (US)

(72) Inventor: Charalambos Polyzopoulos, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 70 days.

(21) Appl. No.: 16/623,560

(22) PCT Filed: Jul. 5, 2017

(86) PCT No.: PCT/US2017/040647
§ 371 (c)(1),
(2) Date: Dec. 17, 2019

(87) PCT Pub. No.: WO2019/009886
PCT Pub. Date: Jan. 10, 2019

(65) Prior Publication Data
US 2021/0148240 A1    May 20, 2021

(51) Int. Cl.
*F01D 9/02* (2006.01)
*F01D 11/00* (2006.01)
*F02C 7/28* (2006.01)

(52) U.S. Cl.
CPC ............ *F01D 9/023* (2013.01); *F01D 11/005* (2013.01); *F02C 7/28* (2013.01); *F05D 2240/12* (2013.01);
(Continued)

(58) Field of Classification Search
CPC . F01D 9/02; F01D 9/023; F01D 9/041; F01D 11/00; F01D 11/005; F02C 7/28;
(Continued)

(56) References Cited

U.S. PATENT DOCUMENTS

| | | | | |
|---|---|---|---|---|
| 3,938,906 A | * | 2/1976 | Michel | F01D 11/005 415/139 |
| 4,666,369 A | * | 5/1987 | Brinkman | F01D 25/243 415/135 |

(Continued)

FOREIGN PATENT DOCUMENTS

| | | |
|---|---|---|
| EP | 1865262 A1 | 12/2007 |
| JP | 2004044538 A1 | 2/2004 |

(Continued)

OTHER PUBLICATIONS

PCT International Search Report and Written Opinion of International Searching Authority dated Mar. 13, 2018 corresponding to PCT International Application No. PCT/US2017/040647 filed Jul. 5, 2017.

*Primary Examiner* — Loren C Edwards

(57) ABSTRACT

A gas turbine sealing interface to seal a gap between a transition duct and a turbine section component is provided. The transition duct includes an outlet exit frame including at least one fastener hole. The turbine section component includes a first stage vane structure including an upstream lip. A seal couples the outlet exit frame to the first stage turbine vane structure. An L-shaped rail including a flat portion and a lipped portion disposed perpendicularly to the flat portion. The seal is secured to the outlet exit frame via the L-shaped rail. An upstream portion of the seal includes a U-shaped cross section forming a first groove. A downstream portion of the seal comprises a groove which engages the upstream lip of the first stage turbine vane structure. A gas turbine engine including a radially inner sealing interface and a radially outer sealing interface is also provided.

10 Claims, 3 Drawing Sheets

(52) U.S. Cl.
CPC ...... *F05D 2240/35* (2013.01); *F05D 2240/55* (2013.01); *F05D 2260/30* (2013.01)

(58) Field of Classification Search
CPC ............. F05D 2240/12; F05D 2240/35; F05D 2240/55; F05D 2260/30
See application file for complete search history.

(56) References Cited

U.S. PATENT DOCUMENTS

| | | | |
|---|---|---|---|
| 6,675,584 B1 * | 1/2004 | Hollis | F01D 11/005 60/800 |
| 2006/0123797 A1 * | 6/2006 | Zborovsky | F01D 9/041 60/800 |
| 2014/0000267 A1 * | 1/2014 | Melton | F01D 9/023 60/752 |

FOREIGN PATENT DOCUMENTS

| | | | | |
|---|---|---|---|---|
| WO | 200227148 A1 | 4/2002 | | |
| WO | 2016068857 A1 | 5/2016 | | |
| WO | WO-2016068857 A1 * | 5/2016 | ............. | F01D 9/023 |

* cited by examiner

SEAL INTERFACE BETWEEN A TRANSITION DUCT AND A STAGE ONE VANE STRUCTURE

BACKGROUND

1. Field

The present application relates generally to gas turbines and components that provide an interface between the combustion section and the inlet of the turbine section of a gas turbine. More specifically, the present application relates to a gas turbine sealing interface to seal a gap between a transition duct and a turbine section component.

2. Description of the Related Art

A combustion turbine engine, such as a gas turbine engine, includes for example a compressor section, a combustor section and a turbine section. Intake air is compressed in the compressor section and then mixed with fuel. The mixture is ignited in the combustor section to produce a high-temperature and high-pressure flow of combustion gases conveyed by a transition duct system to the turbine section of the engine, where thermal energy is converted to mechanical energy. Seals are interposed between respective outlets of the transition ducts and corresponding stage one turbine vane structures to limit compressed air, as may be fluidly coupled to a transition shell, to leak and mix with the hot flow of combustion. A versatile sealing interface that can be retrofittable to existing transition ducts already in the field and fit within the tight clearance existing between the transition duct and the stage one turbine vane structure is desired.

SUMMARY

Briefly described, aspects of the present disclosure relate to a gas turbine sealing interface to seal a gap between a transition duct and a turbine section component as well as a gas turbine including an inner sealing interface and an outer sealing interface.

A first gas turbine sealing interface to seal a gap between a transition duct and a turbine section component is provided. The transition duct includes an outlet exit frame including at least one fastener hole. The turbine section component comprises a first stage vane structure including an upstream lip. A seal couples the outlet exit frame to the first stage turbine vane structure. An L-shaped rail including a flat portion and a lipped portion disposed perpendicularly to the flat portion. The seal is secured to the outlet exit frame via the L-shaped rail. An upstream portion of the seal includes a U-shaped cross section forming a first groove. A downstream portion of the seal comprises a groove which engages the upstream lip of the first stage turbine vane structure.

A gas turbine engine including a transition duct extending between a combustor of a gas turbine engine and a first stage turbine vane structure is also provided. The gas turbine engine includes an inner sealing interface and an outer sealing interface of the kind described above. The inner sealing interface couples a radially inner flange of the outlet exit frame to a radially inner upstream lip of the stage one turbine vane structure. The outer sealing interface couples a radially outer flange of the outlet exit frame to a radially outer upstream lip of the stage one turbine vane structure.

A second gas turbine sealing interface to seal a gap between a transition duct and a turbine section component is provided. The transition duct includes an outlet exit frame including at least one fastener hole. The turbine section component comprises a first stage vane structure including an upstream lip. A seal couples the outlet exit frame to the first stage turbine vane structure. An upstream portion of the seal includes a U-shaped cross section forming a first groove. A downstream portion of the seal comprises a groove which engages the upstream lip of the first stage turbine vane structure. The seal is secured to the outlet exit frame via the U-shaped cross section.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A newer design of the transition duct component of the gas turbine engine is sized differently than the traditional transition duct component and includes an outlet exit frame requiring a bolted seal configuration such that the seal is secured to the outlet exit frame of the transition duct by a bolted connection. On the downstream side of the seal, the seal is secured to the stage one turbine vane structure by a mating floating structure which hangs on the vane structure. In order to use this newer design of the transition duct with an existing stage one turbine vane, a new seal interface configured to fit in the gap between the transition duct and the stage one turbine may be needed. In view of this need, a gas turbine sealing interface to seal a gap between a transition duct and a turbine section component is proposed.

Figure 1:
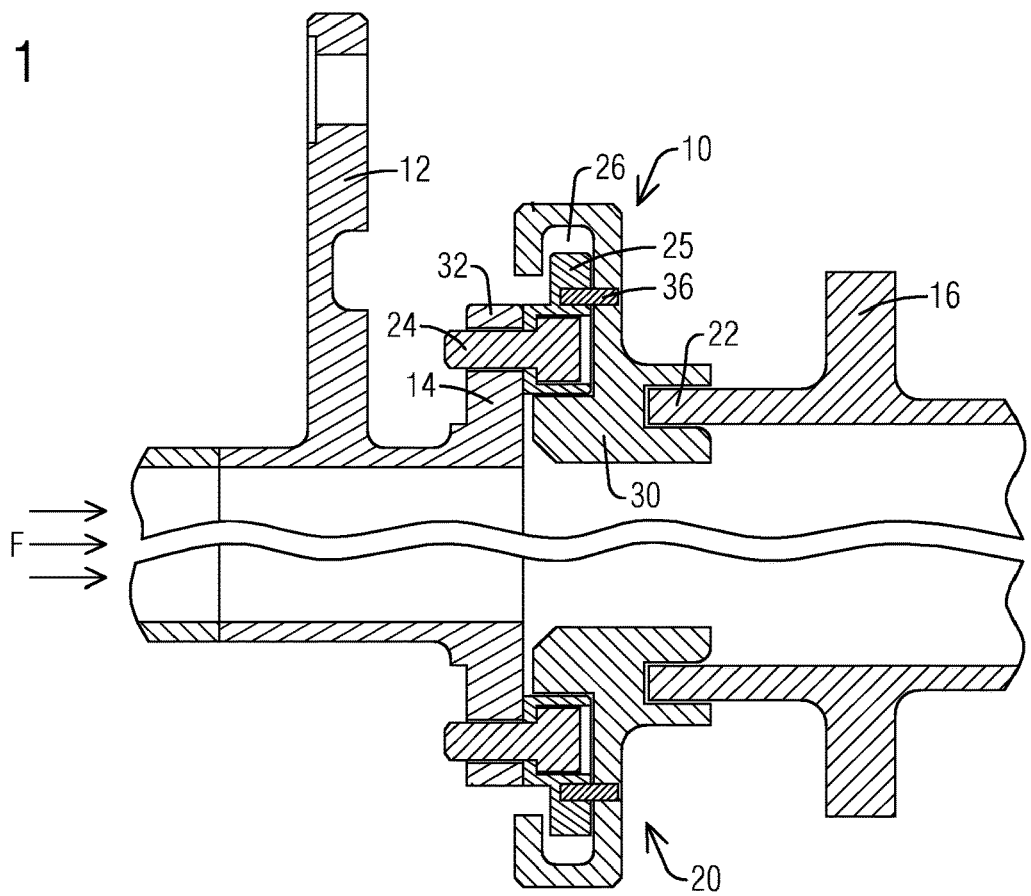
FIG. 1 illustrates a cross sectional view of a first embodiment of sealing interface.
Figure 2:
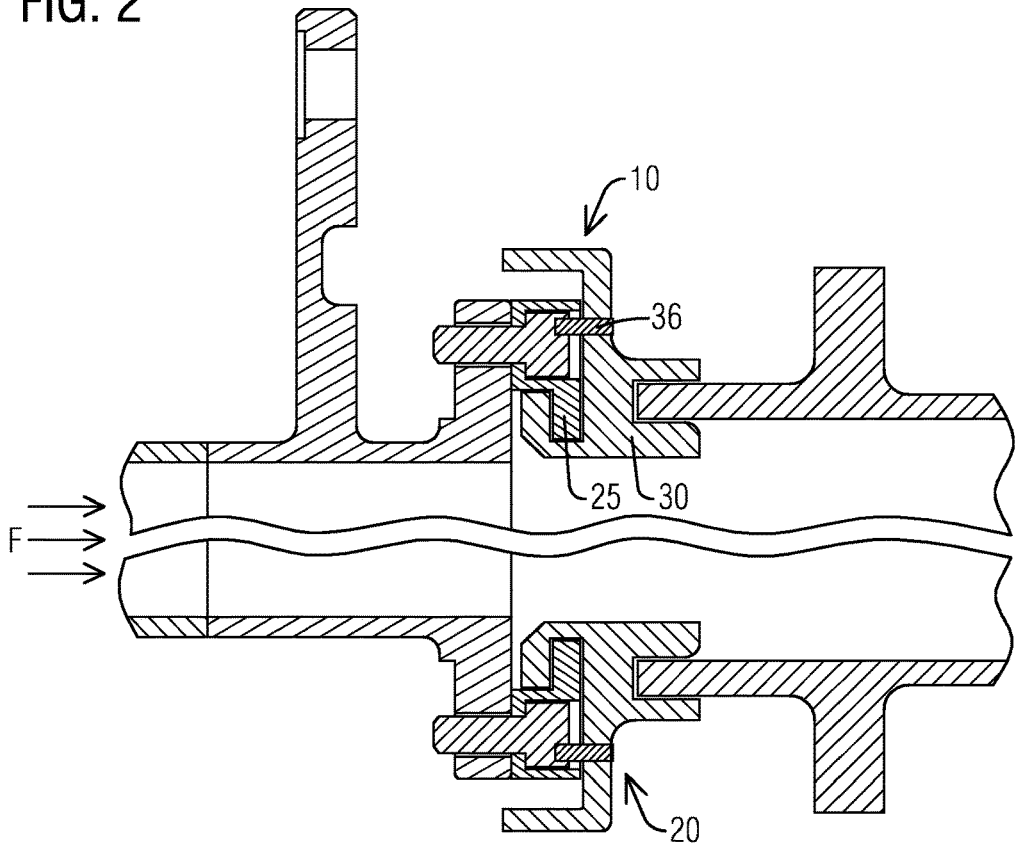
FIG. 2 illustrates a cross sectional view of a second embodiment of a sealing interface.
Figure 3:
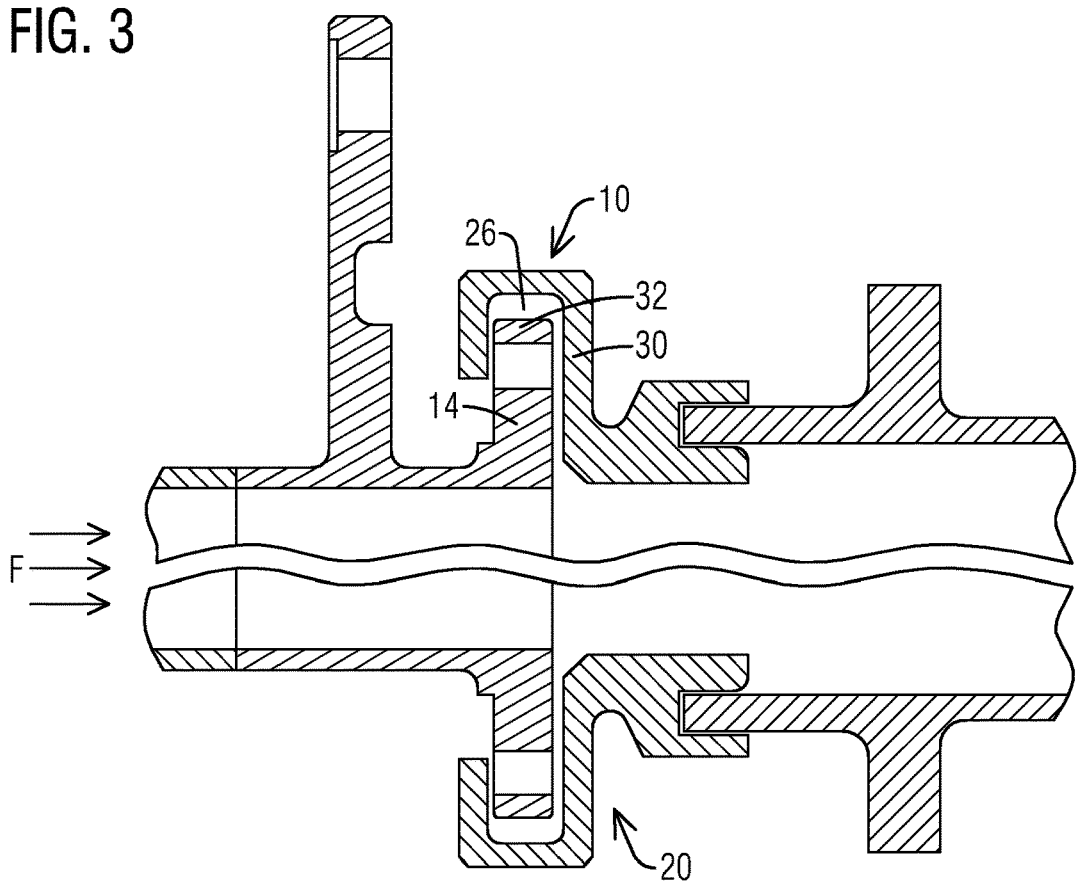
FIG. 3 illustrates a cross sectional view of a third embodiment of a sealing interface.
Figure 4:
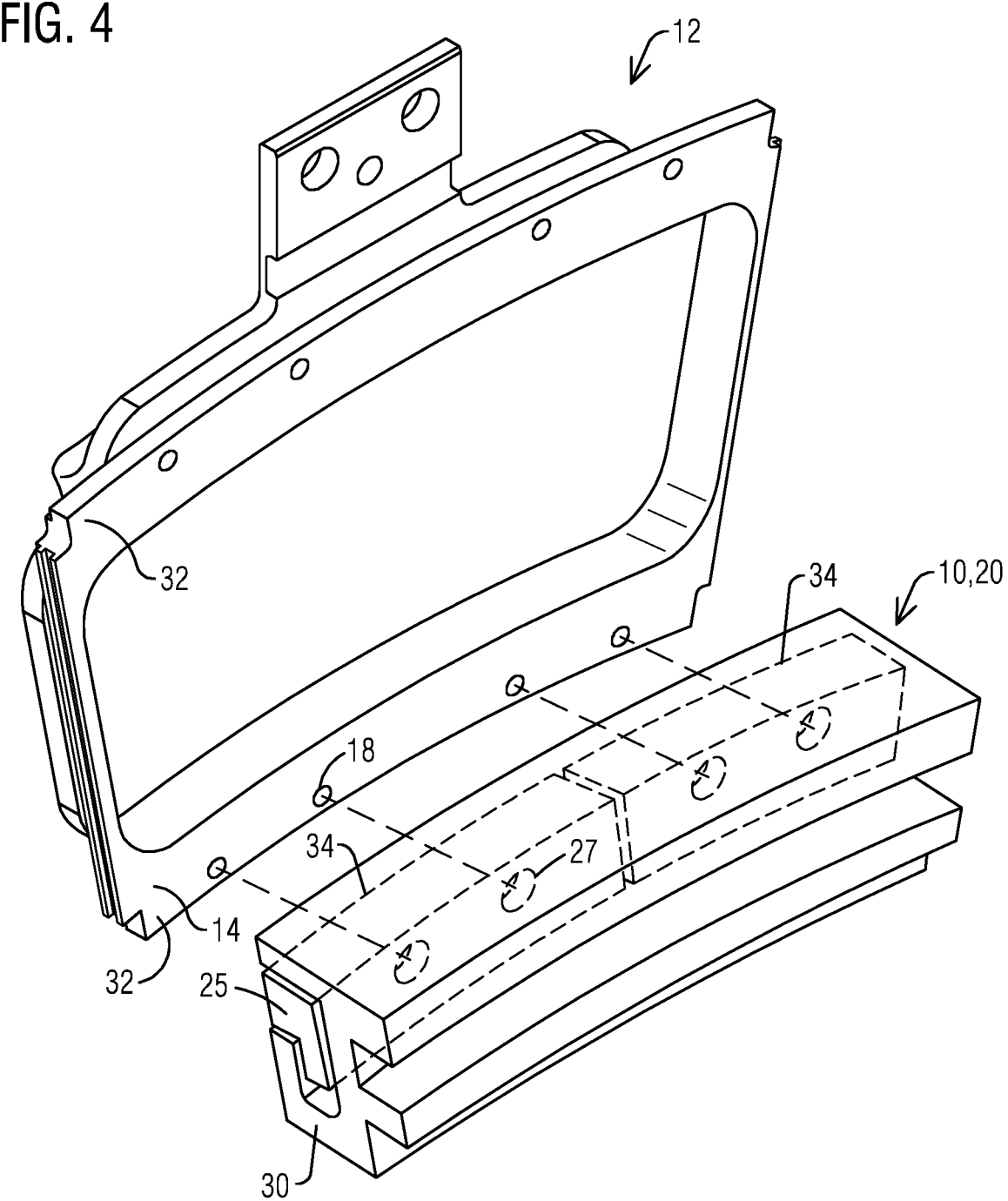
FIG. 4 illustrates a perspective view of a transition duct with a corresponding sealing interface.

FIG. 1 shows a cross-sectional view of an embodiment of a disclosed sealing interface 10, 20 between a transition duct 12 and a turbine section component which in the illustrated embodiments of FIGS. 1-3, is a stage one turbine vane structure 16. The seal interface 10, 20 is arranged to seal a gap between the transition duct 12 and the stage one turbine vane structure 16. An outer sealing interface 10 is positioned radially outward from an inner sealing interface 20 with respect to a longitudinal axis of the gas turbine engine about which axis the gas turbine engine shaft rotates. In FIGS. 1-3, elements with corresponding reference numbers are shown primarily for the outer sealing interface 10, however, one skilled in the art would understand that since the inner sealing interface 20 is essentially a mirror image of the outer sealing interface 10, the reference numbers of the elements of outer sealing interface 20 would correspond to similar elements of the inner sealing interface 20. As seen in FIG. 4, showing a perspective view of the transition duct 12 and the sealing interface 10, 20, according to the embodiment of FIG. 1, the transition duct 12 may include an outlet exit frame 14 including at least one flange 32 having a plurality of fastener holes 18. The stage one turbine vane structure 16 includes an upstream lip 22. The flow path of the combustion gases is designated by F.

In the shown embodiment of FIG. 1, a seal 30 may be arranged to couple the outlet exit frame 14 to the first stage turbine vane structure 16. An upstream portion of the seal 30 is secured to the outlet exit frame 14 via a fastener 24 disposed in a fastener hole of the outlet exit frame 14. The fastener 24 may comprise a bolt. However, the fastener 24 may also include a stud, threaded fastener, etc. The upstream portion of the seal 30 is generally U-shaped in cross-section and defines a first groove 26. The downstream portion of the seal comprises a second groove that engages the lip 22 of the first stage turbine vane structure 16.

Figure 5:
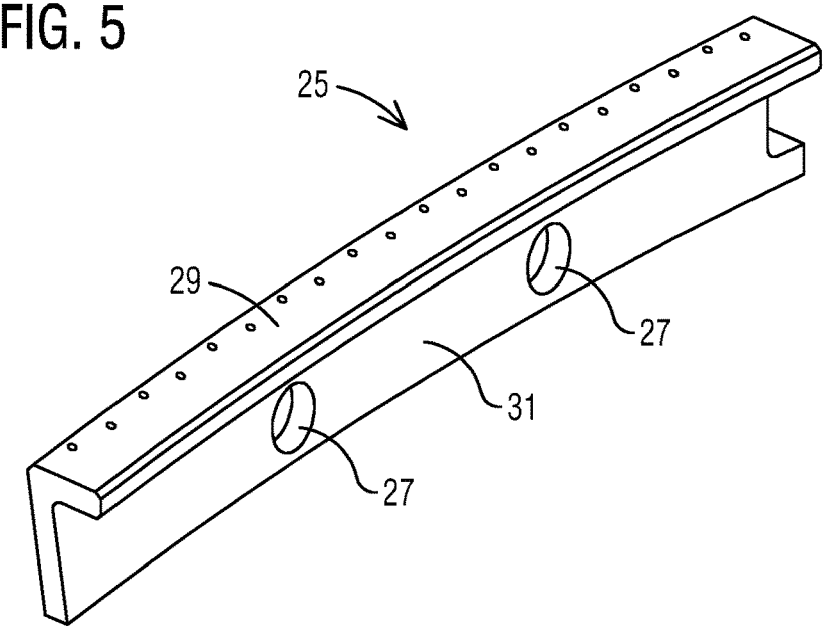
FIG. 5 illustrates a perspective view of an L-shaped rail.

An L-shaped rail 25 may be used to secure the outlet exit frame 14 to the seal 30 via the fastener 24. An embodiment of the L-shaped rail 25 may be seen in FIG. 5. The L-shaped rail 25 includes a flat portion 31 and a lipped portion 29 disposed perpendicularly to the flat portion 31. The flat portion 31 includes at least one through-hole 27 that may be mated to the fastener hole 18. In an embodiment, each of a plurality through-holes 27 in the flat portion 31 may be mated to a corresponding fastener hole of a plurality of fastener holes 18 in the flange 32 of the outlet exit frame 14. The L-shaped rail 25 may include a slight curvature that follows the curvature of the outlet exit frame 14.

In an embodiment, the L-shaped rail 25 may comprise a plurality of segments 34 as may be seen in FIG. 4. Adjacent segments 34 may lie next to one another with a small gap in between adjacent segments 34 or with no gap in between adjacent segments 34 such that they are touching. In the embodiment where a small gap exists between two adjacent segments 34 the gap may be less than 1 mm. Two adjacent segments 34 are shown in FIG. 4, however, it may be appreciated that the number of segments shown should be construed as an example and not in a limiting sense and that the L-shaped rail 25 may comprise any number of segments.

The sealing interface 10, 20 may be created by positioning the flat portion 31 of the L-shaped rail 25 such that the through-hole 27 mates to the fastener hole 18 and the holes 18, 27 are collinear. A fastener 24 may be disposed through the through-hole 27 and the fastener hole 18 securing the L-shaped rail 25 to the outlet exit frame 14. The first groove 26 of the upstream portion may slide over the lipped portion 29 such that the first groove 26 receives the lipped portion 29 of the L-shaped rail 25. This positioning secures the seal 30 to the L-shaped rail 25, thus securing the seal 30 to the outlet exit frame 14.

A second embodiment of the sealing interface 10, 20 may be seen in FIG. 2. This alternate embodiment differs from the embodiment of FIG. 1 in that the U-shaped cross section is inverted from the position of the U-shaped cross section of the seal 30 shown in FIG. 1. The lipped portion 29 of the L-shaped rail 25 similarly is received by the first groove 26, however, in order to accommodate this configuration the L-shaped rail 25 is also inverted from the position of the L-shaped rail 25 shown in FIG. 1. In both of the embodiments shown, respectively in FIGS. 1 and 2, the L-shaped rail 25 and the seal 30 may have varying geometry to accomplish coupling the outlet exit frame 14 to the first stage turbine vane structure 16 as well as the intended sealing functionality.

In the embodiments as shown in FIGS. 1 and 2, a pin 36 extends within a slot formed within the seal 30 and the L-shaped rail 25. The pin 36 may be positioned circumferentially adjacent to the fastener 24. The pin 36 provides a 'safety stop' to prevent circumferential rotation of the seal 30 during operation of the gas turbine engine.

A third embodiment of the sealing interface 10, 20 may be seen in FIG. 3. The third embodiment differs from the previously described embodiments of FIGS. 1 and 2 in that an L-shaped rail is not used. The first groove 26 of the U-shaped cross section receives the flange 32 of the outlet exit frame 14 securing the seal 30 to the outlet exit frame 14 of the transition duct 12.

In an embodiment, the outlet exit frame 14 may include a coating in order to protect it from wear and fretting. During operation, the seal 30 may rub against the exit transition frame 14 and the L-shaped rail 25 necessitating a coated surface in order to extend the life of the components the seal 30 rubs against. Thus, the L-shaped rail 25 may also include a coating. The L-shaped rail 25 may be coated before assembly and separately from the other sealing components.

In an embodiment, a length of the seal 30 from an upstream edge of the upstream portion to a downstream edge of the downstream portion may lie in a range of 46 mm to 48 mm. The newer design of the transition duct 12 as referenced above may be slightly longer than the traditional transition duct, thus requiring a seal having an overall shorter length. Each seal as described in the embodiments of FIGS. 1-3 may be configured to accommodate the smaller gap between the transition outlet exit frame 14 and the stage one turbine vane structure 16.

In one non-limiting embodiment, the seal 30 may comprise a nickel based superalloy or a nickel-cobalt superalloy material such as Inconel 617. Similarly, the L-shaped rail 25 may comprise a nickel based superalloy or a nickel-cobalt superalloy material. Inconel 617 has suitable thermal resistance qualities appropriate to handle the temperature of the combustion gases that the seal 30 may be exposed to in the flow path F. While Inconel 617 has been exemplified here as an appropriate material for the seal 30 and the L-shaped rail 25, one skilled in the art would understand that other materials having similar properties may also be used for the seal 30 and the L-shaped rail 25.

The proposed sealing interfaces allow the newer design of the transition duct to mate with existing stage one turbine vane structures already in the field such that the sealing interface is retrofittable. In addition, the proposed solution is cost effective as it allows the transition duct the versatility of being mated to more than one style of stage one turbine vane structure while continuing to provide consistent sealing performance.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A gas turbine sealing interface to seal a gap between a transition duct and a turbine section component, comprising:
   an outlet exit frame of the transition duct including a fastener hole;
   a first stage turbine vane structure including an upstream lip;

a seal coupling the outlet exit frame to the first stage turbine vane structure, an upstream portion of the seal includes a U-shaped cross section forming a first groove, wherein a downstream portion of the seal comprises a second groove; and an L-shaped rail including a flat portion and a lipped portion disposed perpendicularly to the flat portion, the flat portion includes a counterbore, the counterbore including a through-hole that mates to the fastener hole, the L-shaped rail is secured to the outlet exit frame by a fastener inserted in the through-hole and the fastener hole, the lipped portion of the L-shaped rail extending radially in respect to a flow path, and the upstream lip of the first stage turbine vane structure is engaged in the second groove, the fastener including a bolt head, wherein the first groove receives the lipped portion of the L-shaped rail, wherein the seal is secured to the outlet exit frame via the L-shaped rail, wherein the bolt head is configured to be recessed within the counterbore wherein the seal overlaps the counterbore along an axial length of the counterbore in a direction of the flow path.

2. The gas turbine sealing interface as claimed in claim 1, wherein the lipped portion extends radially away from the flow path.

3. The gas turbine sealing interface as claimed in claim 1, wherein the lipped portion extends radially towards the flow path.

4. The gas turbine sealing interface as claimed in claim 1, wherein the L-shaped rail comprises a plurality of adjacent rail segments.

5. The gas turbine sealing interface as claimed in claim 1, wherein the outlet exit frame includes a coating.

6. The gas turbine sealing interface as claimed in claim 1, wherein the L-shaped rail includes a coating.

7. The gas turbine sealing interface as claimed in claim 1, wherein a length of the seal from an upstream edge of the upstream portion to a downstream edge of the downstream portion is in a range of 46 mm to 48 mm.

8. The gas turbine sealing interface as claimed in claim 1, wherein the seal comprises a nickel-based superalloy or a nickel-cobalt based superalloy.

9. The gas turbine sealing interface as claimed in claim 1, wherein a pin extends from a first slot within the seal and into a corresponding second slot within the L-shaped rail preventing circumferential rotation of the seal during operation of a gas turbine engine.

10. The gas turbine sealing interface as claimed in claim 1, wherein the seal prevents the removal of the fastener.

* * * * *